United States Patent [19]
Kasuya et al.

[11] Patent Number: 5,916,347
[45] Date of Patent: Jun. 29, 1999

[54] HYDRAULIC SERVO DEVICE FOR AUTOMATIC TRANSMISSIONS

[75] Inventors: Satoru Kasuya; Masahiro Hayabuchi; Nobutada Sugiura, all of Anjo, Japan

[73] Assignee: Aisin AW Co., Ltd., Anjo, Japan

[21] Appl. No.: 08/972,745

[22] Filed: Nov. 18, 1997

[30] Foreign Application Priority Data

Dec. 20, 1996 [JP] Japan .................................. 8-354670

[51] Int. Cl.⁶ ....................................................... F01B 7/00
[52] U.S. Cl. .................................................. 92/63; 92/164
[58] Field of Search ............................. 92/164, 61, 62, 92/63; 188/77 R, 196 P

[56] References Cited

U.S. PATENT DOCUMENTS

| | | | |
|---|---|---|---|
| 3,185,042 | 5/1965 | Hastings | 95/164 X |
| 3,848,414 | 11/1974 | Larsson | 92/164 X |
| 4,601,233 | 7/1986 | Sugano | 92/63 X |
| 4,787,494 | 11/1988 | Ogasawara et al. | |
| 5,012,725 | 5/1991 | Leary | 92/63 |
| 5,016,521 | 5/1991 | Haka | |
| 5,018,434 | 5/1991 | Haka | |
| 5,456,161 | 10/1995 | Yuda et al. | 92/164 X |

FOREIGN PATENT DOCUMENTS 1231201  5/1971  United Kingdom ..................... 92/164

Primary Examiner—Hoang Nguyen
Attorney, Agent, or Firm—Oliff & Berridge, PLC

[57] ABSTRACT

A hydraulic servo device for an automatic transmission is presented with a reduced axial length as a result of the manner in which oil pressure is fed into the cylinder. The hydraulic servo device includes a cylinder, a piston position to slide within the cylinder, a rod connected to the piston, and a cover member for closing the open end of the cylinder. The cover member, in association with the cylinder and the piston, defines an oil chamber in the cylinder. An oil passage for feeding an oil pressure to the oil chamber is formed by an opening in the cover member.

7 Claims, 3 Drawing Sheets

HYDRAULIC SERVO DEVICE FOR AUTOMATIC TRANSMISSIONS

BACKGROUND OF THE INVENTION

1. Field of Invention

The invention relates to a hydraulic servo device for actuating frictional engagement elements to shift an automatic transmission.

2. Description of Related Art

In an automatic transmission, a band brake is fastened on a drum and is used as a frictional engagement element. The band brake is connected to a specific reaction element, and retains the reaction element on the transmission case so that gear stages may be changed. In case of the band brake, a hydraulic servo device is usually used as an actuator in fastening the band on the drum. This hydraulic servo device includes a cylinder, a piston fit to slide within the cylinder, a rod for outputting a force to actuate the piston, and a cover member for closing the open end of the cylinder. The cover member, in association with the cylinder and the piston, defines an oil chamber in the cylinder. The oil pressure to the oil chamber is usually fed from an oil passage which is opened in the circumferential wall of the cylinder. A typical example of this hydraulic servo device is disclosed in U.S. Pat. No. 4,787,494.

As shown in FIG. 4, if the oil pressure is fed to the oil chamber from the oil passage opened in the circumferential wall of the cylinder, a portion for feeding the oil pressure has to be retained between a piston p and a cover member r. In addition, seal members $S_P$ and $S_R$ of the O-rings have to be placed around the entire circumference of the opening to prevent oil leakage. Therefore, even at the return stroke end of the piston p, as shown at the upper half of the figure, a predetermined axial clearance D has to be kept between the seal member $S_P$ of the piston p and the seal member $S_R$ of the cover member r. Because the two seal members $S_P$ and $S_R$ are full circumference seals, this arrangement implies that the piston seal $S_P$, an oil passage opening q, and the cover member seal $S_R$ are arranged in series in the axial direction of a cylinder c. As a result, the axial length L of the cylinder c is the sum of the approximate length for the required piston stroke for the cylinder, and the length for forming the oil passage opening q.

However, as shown above, the hydraulic servo device of the band brake is arranged to extend radially inward from the transmission case to the speed change mechanism. Therefore, since the hydraulic servo device has a large axial length, the gear train of the speed change mechanism and the shape and arrangement of the related members cause the size of the entire mechanism of the automatic transmission to be enlarged. Thus, the large size of the resulting automatic transmission makes it difficult to mount on a vehicle.

SUMMARY OF THE INVENTION

A first object of the invention is to provide a hydraulic servo device for an automatic transmission with a reduced axial length as a result of the manner in which oil pressure is fed into the cylinder.

A second object of the invention is to simplify the structure of the feed oil passage for feeding the oil pressure to the hydraulic servo device in the automatic transmission, as a result of the feed passage's relative arrangement with the valve body.

A third object of the invention is to use the servo oil pressure fed to the hydraulic servo device, to improve the sealing effect of the oil passage.

A fourth object of the invention is to prevent the servo oil pressure from acting upon the valve body while simplifying the feed oil passage construction and improving the sealing effect of the oil passage.

In order to achieve the first object of the invention, a hydraulic servo device for an automatic transmission includes a cylinder, a piston that slides within the cylinder, a rod connected to the piston, and a cover member for closing the open end of the cylinder. The cover member in association with the cylinder and the piston, defines an oil chamber in the cylinder. An oil passage for feeding an oil pressure to the oil chamber, is opened in the cover member.

In order to achieve the second object, the cylinder is arranged such that its open end contacts the valve body and the opening of the cover member communicates with the oil passage of the valve body.

In order to achieve the third object, the cover member is made separate from the valve body. A seal member, for covering the perimeter of the opening of the cover member and the opening of the oil passage of the valve body, is then sandwiched between the cover member and the valve body.

In order to achieve the fourth object, the cover member is prevented from coming out from the open end of the cylinder by an axial movement regulating device. In addition, the valve body and the cylinder are relatively positioned to keep a predetermined clearance between the valve body and the cover member.

According to the invention, the opening for the oil passage that feeds the oil pressure into the oil chamber of the hydraulic servo device is formed in the open end of the cylinder. As a result, unlike the hydraulic servo device of the prior art, it is not necessary have the oil passage opening placed in series with the piston and the cover member seals in the axial direction of the cylinder. As a result, the design restrictions on positioning of the opening of the oil passage can be eliminated and thus, the axial size of the cylinder may be shortened.

In addition, the length of the oil passage for introducing the servo oil pressure from the valve body into the oil chamber of the cylinder can be shortened to improve the oil pressure response of the hydraulic servo device. Unlike the configuration of the prior art, the oil passage through the automatic transmission case need not be formed between the valve body and the hydraulic servo device. Thus, the oil passage can be shortened to reduce the size of the transmission and the transmission case structure can be simplified to reduce the overall cost.

Moreover, the cover member is able to receive the thrust from the servo oil pressure fed to the oil chamber of the servo device in the direction of the cylinder axis. By making use of the servo oil pressure, the seal member can be compressed between the cover member and the valve body, thereby improving the sealing effect of the oil passage connected portion.

Furthermore, a predetermined clearance is kept between the valve body and the cover member of the cylinder so that the strong force received by the cover member from the servo oil pressure is prevented from being directly transmitted to the valve body. As a result, the sealing property of the faces in contact between the valve body and the transmission case is not deteriorated. Therefore, the fastening force inbetween the valve body and the transmission case need not be unnecessarily increased by the fastening bolts.

BRIEF DESCRIPTION OF THE DRAWINGS

The invention is described in detail with reference to the following drawings, wherein like numerals represent like elements.

DETAILED DESCRIPTION OF PREFERRED EMBODIMENTS

Figure 1:
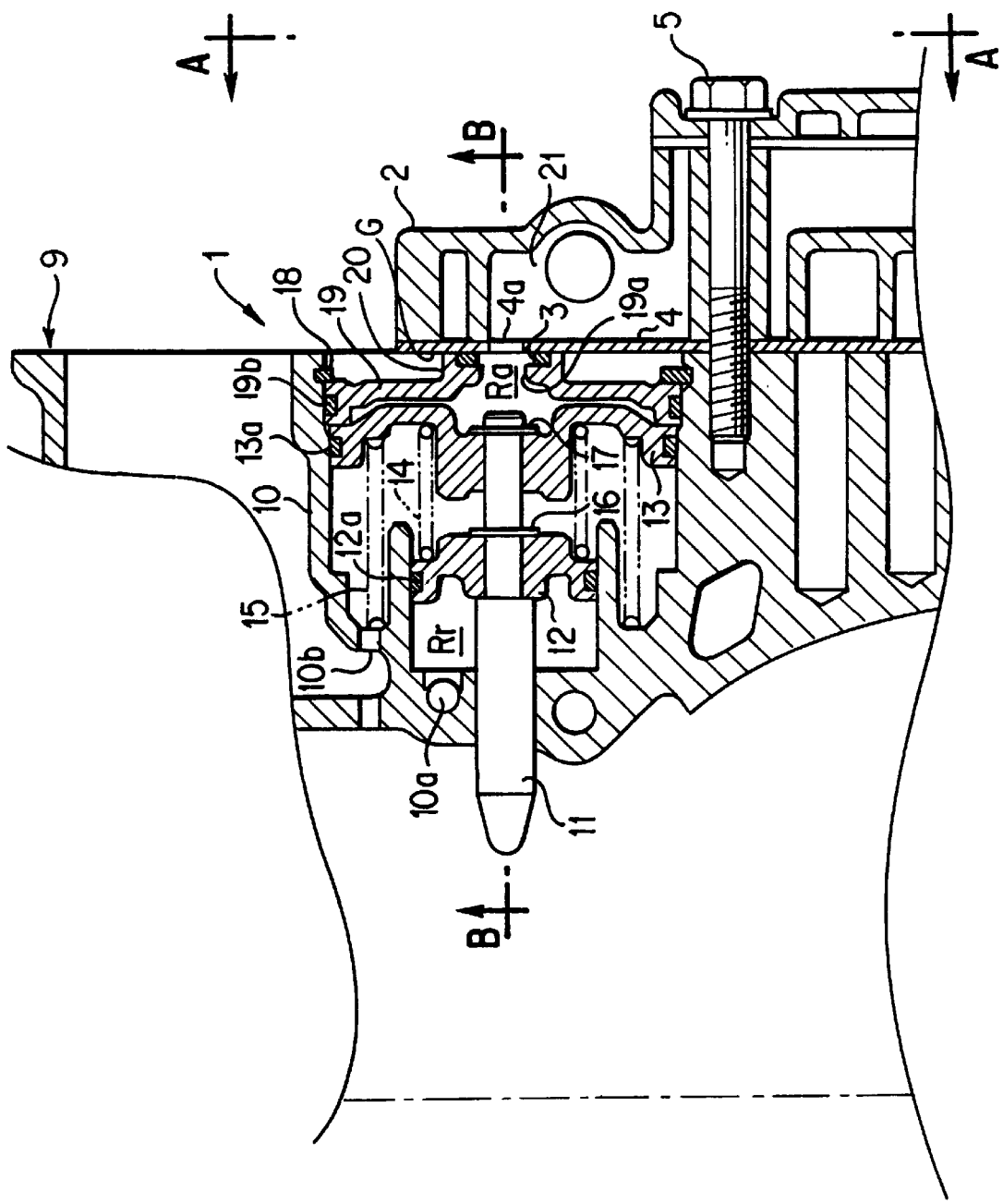
FIG. 1 is a sectional diagram showing a hydraulic servo device according to an embodiment of the invention.
Figure 2:
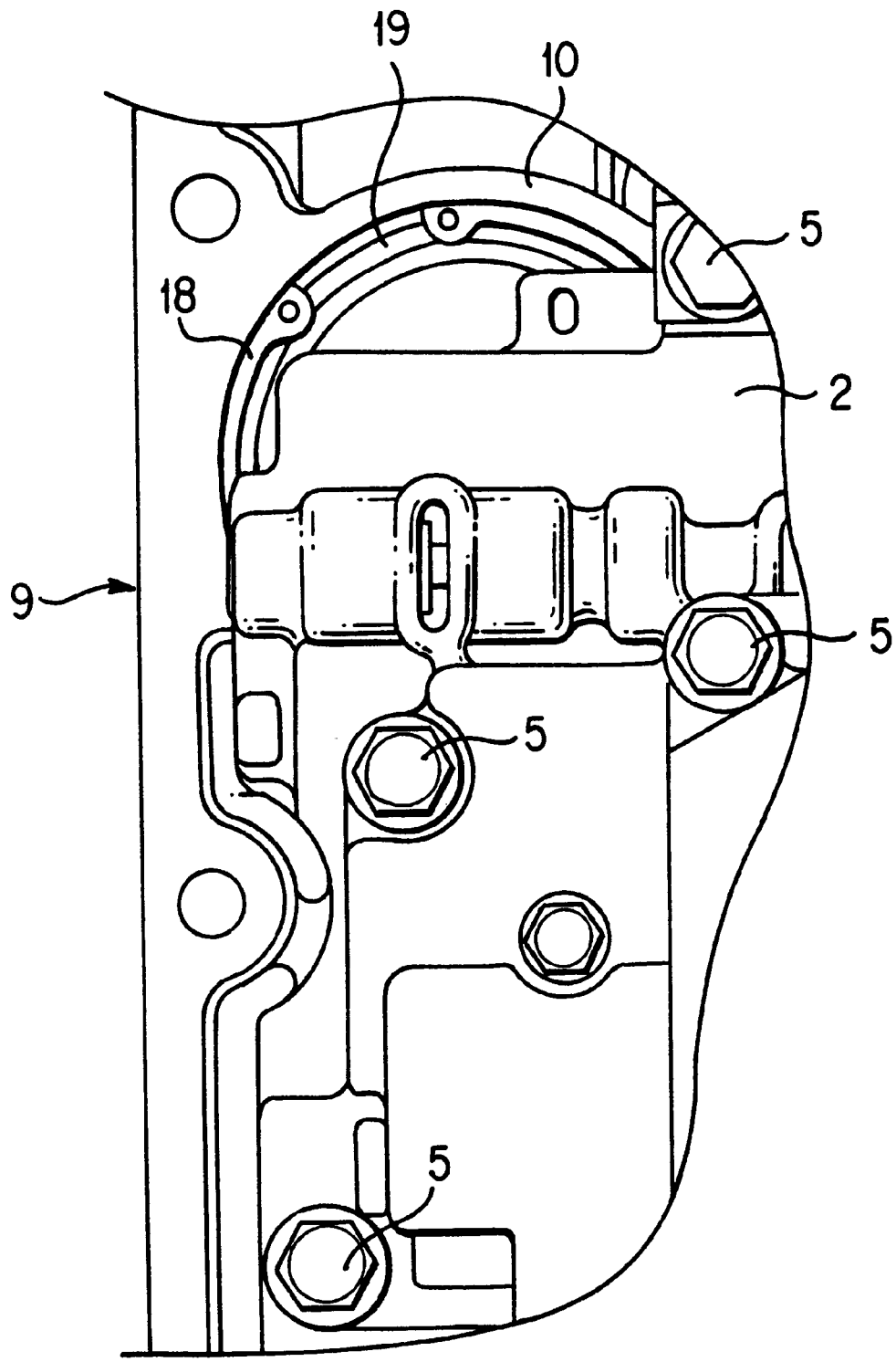
FIG. 2 is a side elevation taken in the direction A—A of FIG. 1.

An embodiment of the invention will be described with reference to the accompanying drawings. FIGS. 1 and 2 present a sectional diagram and a side elevation, respectively, showing a portion of an automatic transmission to which the hydraulic servo device of the invention is applied. As shown in FIG. 1, the hydraulic servo device 1 comprises: a cylinder 10; two pistons 12 and 13 of smaller and larger radii, respectively, and slidably fitted in the cylinder 10; and a rod 11 connected to the two pistons 12 and 13 for forming an output member responsive to a servo force. The hydraulic servo device 1 is provided with a cover member 19 separate from the cylinder 10, for closing the open end of the cylinder. The cover member 19, along with the cylinder 10 and the radially larger piston 13, defines an oil chamber Ra.

According to the invention, an oil passage 21 is opened into the cover member 19 for feeding oil pressure to the oil chamber Ra. The cylinder 10 is arranged such that its open end contacts a valve body 2 of the automatic transmission, and the opening 19a of the cover member 19 communicates with an oil passage 21 of the valve body 2. In this embodiment, the cover member 19 is made separate from the valve body 2. Sandwiched in-between the cover member 19 and the valve body 2 is an annular seal member 3 which covers the perimeter of the opening 19a of the cover member 19 and the oil passage opening 21 of the valve body 2. A snap ring 18 prevents the cover member 19 from coming out of the cylinder and forms an axial movement regulating means at the open end of the cylinder 10. The valve body 2 and the cylinder 10 are positioned relative to each other so that a predetermined clearance G is kept between the valve body 2 and the cover member 19.

Figure 3:
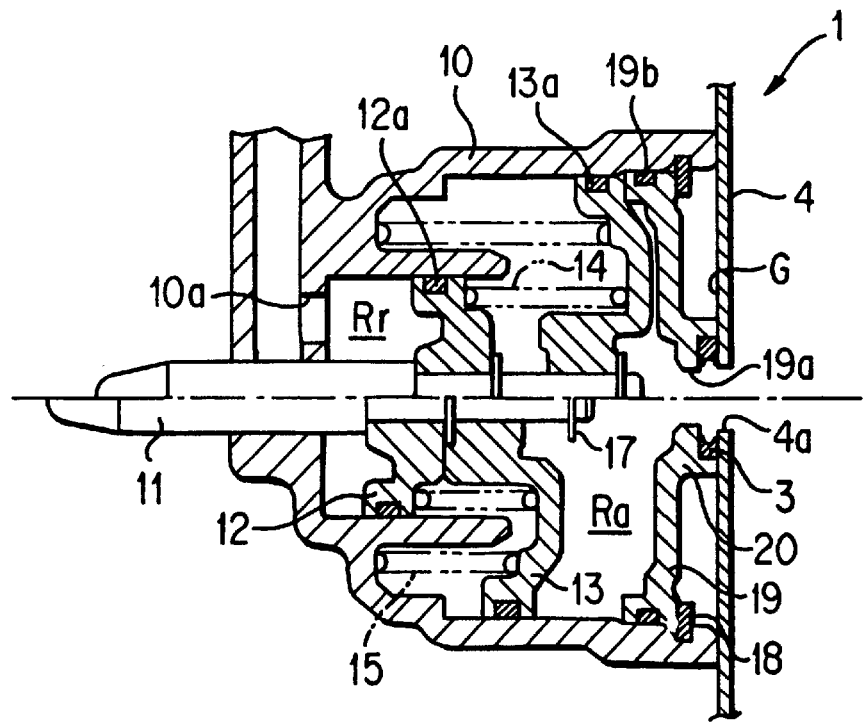
FIG. 3 is a sectional diagram taken in the direction B—B of FIG. 1.
Figure 4:
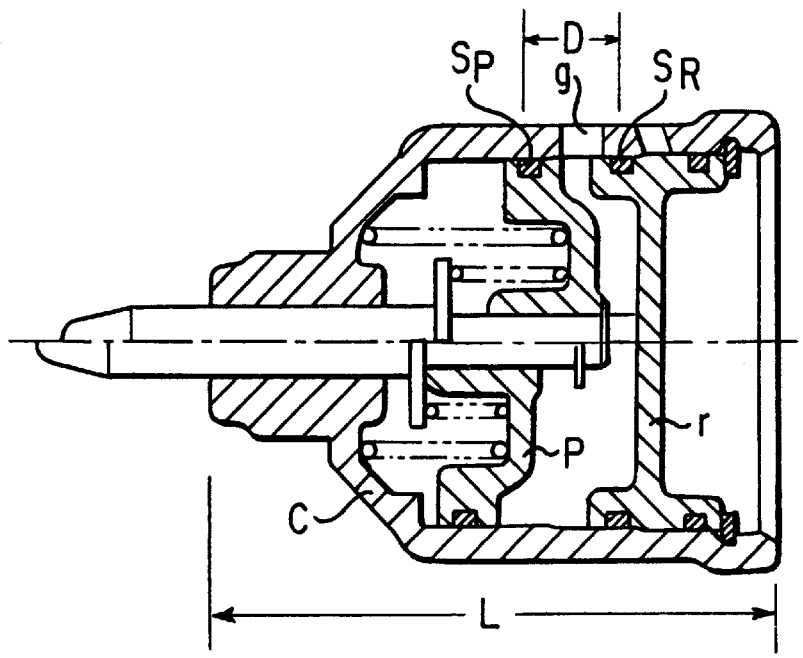
FIG. 4 is a sectional diagram showing the hydraulic servo device of the prior art.

With reference to FIG. 3, the cylinder 10 is formed into a bottomed cylindrical shape. A stepped bore is formed to have a smaller radius at the bottom side and a larger radius at the open end side of the cylinder. The radially smaller piston 12 and the radially larger piston 13 are slidably fitted in the radially smaller bore portion and the radially larger bore portion, respectively. The open end is closed oil-tight by the cover member 19 positioned in the radially larger bore portion of the cylinder 10. A damper spring 14 is arranged to provide a predetermined initial load between the radially smaller piston 12 and the radially larger piston 13. A return spring 15 is arranged to provide a predetermined initial load between the radially larger piston 13 and the bottom wall of the cylinder 10.

The rod 11 is formed into a shaft having steps of different radii and is slidably supported by the cylinder 10 through the two pistons 12 and 13. The rod 11 is configured such that its radially larger portion placed in the sliding hole of the cylinder bottom wall, and its radially smaller portion is placed in the center bores of the radially smaller piston 12 and the radially larger piston 13. The radially larger end of the rod 11 is formed into a spherical shape and abuts against the application side bracket of the brake band (not shown).

The radially smaller piston 12 is sealed around its entire circumference by an O-ring 12a seated in a ring groove formed in the piston's outer circumference. The radially smaller piston 12 is fixed immovably in the axial direction with respect to the rod 11 such that the face of one end of the piston abuts against the stepped portion of the rod 11 and the face of the other end of the piston abuts against a washer 16 fixed on the rod 11. The radially larger piston 13 is sealed around its entire circumference by fitting an O-ring 13a seated in a ring groove formed in the piston's outer circumference. The radially larger piston is slidably fitted on the radially smaller portion of the rod 11 and is given a predetermined stroke within a range so that it abuts against either a snap ring 17, fitted in a groove at the side end of the radially smaller portion of the rod 11, or the washer 16. Both the snap ring 17 and the washer 16 act as stoppers.

Like the two pistons 12 and 13, the cover member 19 is sealed around its entire circumference by an O-ring 19b seated in a ring groove formed in the cover's outer circumference. The cover member 19 has an oil passage opening 19a formed in its central portion and directed in the axial direction. The oil passage opening 19a is surrounded by an annular portion 20 projecting from the outer end face of the cover member 19, to form a stepped hole in the inner circumference of the projecting portion. A seal member 3 having a seal lip on its inner circumference is placed in the stepped portion.

A snap ring 18 is seated in a ring groove that is formed in the vicinity of the outer end portion of the inner circumference of the radially larger bore of the cylinder 10 and prevents the cover member 19 from coming out. Thus, the cover member 19, as restricted from moving axially outward from the end portion of the cylinder 10 by the snap ring 18, is positioned to abut against the snap ring 18 in a position slightly retracted inward from the outer end face of the cylinder.

As shown in FIG. 1, the valve body 2 and the automatic transmission case 9 are fastened to the cylinder 10 of the hydraulic servo 1 by means of bolts 5 in alignment with the oil passage opening 4a of a separator plate 4. The separator plate 4 is sandwiched between the automatic transmission case 9 and the valve body 2 when they are assembled. As a result, the oil chamber Ra, as defined by the radially larger bore portion of the cylinder 10, the cover member 19, and the radially larger piston 13, is connected to the oil pressure feed circuit which is formed in the valve body 2 by the oil passage of the separator plate 4 sandwiched between the valve body 2 and the transmission case 9 through the oil passage opening 19a of the cover member 19. In this embodiment, a release oil chamber Rr, defined by the smaller bore portion of the cylinder 10 and the radially smaller piston 12, is connected to a feed circuit for feeding the oil pressure to a hydraulic servo device of another frictional engagement element (not shown), through an oil passage 10a, as formed in the cylinder bottom wall. The atmosphere in the return spring's arranged space, as defined by the larger bore portion of the cylinder 10 and the two pistons 12,13, is released into the space in the transmission case 9 by a breather hole 10b formed in the bottom wall of the cylinder 10.

A description of the relationship between the feed/discharge of the oil pressure to and from the hydraulic servo device 1 and the accompanying displacements of the two pistons 12,13 and the rod 11 is given with reference to FIG. 3.

The upper half of FIG. 3 shows a standby state of the hydraulic servo device 1. In this state, the oil pressure is not fed to the two oil chambers Ra and Rr. Then, the radially larger piston 13 is moved to the retracted position by the force of the return spring 15, and the radially smaller piston 12 is thrust away from the radially larger piston 13 by the force of the damper spring 14. The rod 11, which is fixed on the piston 13, is thrust away and is stopped in the stroke, at a position where the snap ring 17 at the leading end of the rod 11 abuts against the radially larger piston 13.

Contrary to this state, when the oil pressure is fed exclusively to the release oil chamber Rr while the radially larger piston 13 is left immovable, as shown in the upper half position of FIG. 3, the radially smaller piston 12 is retracted together with the rod 11 while compressing the damper spring 14. The radially smaller piston 12 is stopped in the retracted position when it abuts against the radially larger piston 13. In this state, the brake band (not shown) is opened using its own opening force and is positioned in an ordinary released state in which the brake band is spaced the maximum distance from the drum circumference. When the oil pressure of the release oil chamber Rr is released from this state, the radially smaller piston 12 is moved forward in the reverse course so that the hydraulic servo device 1 restores the standby state.

When the oil pressure is fed to the application oil chamber Ra in the standby state, the radially larger piston 13 is moved forward from the position shown in the upper half of FIG. 3 and compresses the return spring 15. At this time, the radially smaller piston 12 is also moved forward by the force of the damper spring 14 to keep its relative position to the radially larger piston 13. Thus, the two pistons 12,13 are moved as far forward so that the brake band (not shown) comes into engagement with the drum to stop the rod 11. When the brake band and the drum come into contact so that the rod 11 stops, the radially larger piston 13 then continues to further advance to compress the damper spring 14. During this action, the rod 11 is subjected to the reaction force by the compression of the damper spring 14 through the radially smaller piston 12. That reaction force, as damped by the elasticity of the damper spring 14, is applied to the brake band and effectively damps the application shock at the initial brake application.

As shown at the lower half of FIG. 3, when the radially larger piston 13 is further moved forward to abut against the radially smaller piston 12, the thrust of the oil pressure applied to the radially larger piston 13 is applied directly to the rod 11 through the radially smaller piston 12 so that the brake band performs a brake applying action and fastens to the drum with a strong force at the forward position of the hydraulic servo device 1. When the oil pressure of the application oil chamber Ra is released from this state, the radially larger piston 13 is retracted in the reverse course so that hydraulic servo device 1 is restored to its standby state. Thus, in this hydraulic servo device 1, in order to establish a predetermined gear stage, the rod 11 is thrust out by the feed of the oil pressure to the application oil chamber Ra at the radially larger piston's 13 aforementioned retracted position or standby position, so that the rod 11 moves to the advanced position for the brake application.

Thus, according to the embodiment described above, the oil passage 19a feeds the oil pressure to the application oil chamber Ra of the hydraulic servo device 1 and is formed as an opening in the open end of the cylinder 10. As a result, unlike the hydraulic servo device of the prior art, the oil passage 19a need not be opened in series in the cylinder axis direction, i.e., between the positions of the individual seal members of the piston and the cover member in the returned positions. Thus, restrictions on the positioning of the opening for the oil passage are eliminated, thereby increasing the degree of freedom for the oil passage connection and allowing the axial size of the cylinder 10 to be reduced.

Moreover, the feed oil passage for feeding the servo oil pressure from the valve body 2 to the cylinder 10 is shortened by the positioning of the open end of the cylinder 10 and the valve body 2 without the interposition of any oil passage in the automatic transmission case 9. This shortening of the feed oil passage improves the response of the hydraulic servo device 1 to the changes in oil pressure. Moreover, because of this shortened oil passage, the transmission can be made smaller and the transmission case 9 can be manufactured at a lower cost because of its simplified structure.

Furthermore, the cover member 19 is made separate from the valve body 2 so that the servo oil pressure fed to the application oil chamber Ra of the servo device 1 may compress the seal member 3 between the cover member 19 and the valve body 2. The compression makes use of the fact that the cover member 19 receives a force in the axial direction of the cylinder 10. As a result, the sealing effect of the oil passage connection can be improved by the force applied by the servo oil pressure.

In addition, the predetermined clearance G is kept between the valve body 2 and the cover member 19 of the hydraulic servo device 1. This configuration prevents the strong force applied to the cover member 19 by the servo force at the time the oil pressure is fed to the application oil chamber Ra, from being transmitted directly to the valve body 2. As a result, the sealing property of the faces in contact between the valve body 2 and the transmission case 9 is not deteriorated by the servo oil pressure. Therefore, the fastening force between the valve body 2 and the transmission case 9 need not be increased by the fastening bolts 5.

Although the invention has been described on the basis of the above embodiment in which the individual features are combined, the invention should not be limited to any specific configuration but adapted to a variety of specific configurations within the scope of the individual claims set forth below. In the above embodiment, for example, the cover member is made separate of the valve body. However, these components can be integrated to provide a construction in which the valve body acts as the cover member.

What is claimed is:

1. A hydraulic servo device for an automatic transmission, comprising:
   a cylinder having an open end;
   a first piston fitted slidably in the cylinder;
   a rod connected to the first piston;
   a cover member of closing the open end of the cylinder, the cover member having an opening;
   a first oil chamber located in the cylinder and defined by the cover member, the cylinder, and the first piston;
   a valve body, for the automatic transmission, contacted with the open end of the cylinder, the valve body is separated from the cover member; and
   a seal member located between the cover member and the valve body, for covering the opening in the cover member and an opening of the oil passage of the valve body, wherein oil pressure is fed from the opening of the valve body to the first oil chamber through the seal member and the opening in the cover member.

2. The hydraulic servo device according to claim 1, further comprising:
   axial movement regulating means for preventing the cover member from coming out from the open end of the cylinder.

3. The hydraulic servo device according to claim 1, wherein the valve body and the cylinder are relatively positioned to keep a predetermined clearance between the valve body and the cover member.

4. The hydraulic servo device according to claim 1, wherein the cylinder has a smaller bore portion, the smaller bore portion forming a second oil chamber.

5. The hydraulic servo device according to claim 1, further comprising a second piston fitted slidably in the cylinder.

6. The hydraulic servo device according to claim 5, further comprising a first spring, the first spring being arranged to provide an initial load between the second piston and the first piston.

7. The hydraulic servo device according to claim 6, further comprising a second spring, the second spring being arranged to provide an initial load between the first piston and the cylinder.

* * * * *